United States Patent
Li et al.

(10) Patent No.: US 10,405,385 B2
(45) Date of Patent: Sep. 3, 2019

(54) ELIMINATING FLICKER AT LIGHT LOAD FOR DRIVER COMPATIBLE WITH NAFTA DIM ECG

(71) Applicant: LEDVANCE GmbH, Garching bei Munchen (DE)

(72) Inventors: Zhifeng Li, Guangdong (CN); Hui Ye, Guangdong (CN)

(73) Assignee: LEDVANCE GMBH, Garching Bei Munich (DE)

( * ) Notice: Subject to any disclaimer, the term of this patent is extended or adjusted under 35 U.S.C. 154(b) by 0 days.

(21) Appl. No.: 16/126,637

(22) Filed: Sep. 10, 2018

(65) Prior Publication Data

US 2019/0104581 A1    Apr. 4, 2019

(30) Foreign Application Priority Data

Sep. 29, 2017   (CN) .......................... 2017109094099

(51) Int. Cl.
H05B 33/08    (2006.01)

(52) U.S. Cl.
CPC ..... *H05B 33/0815* (2013.01); *H05B 33/0887* (2013.01)

(58) Field of Classification Search
CPC .................. H05B 33/0815; H05B 33/0887
See application file for complete search history.

(56) References Cited

U.S. PATENT DOCUMENTS

| | | | |
|---|---|---|---|
| 9,538,601 B1* | 1/2017 | Mangtani | H05B 33/0854 |
| 2010/0090604 A1* | 4/2010 | Maruyama | H05B 33/0803 |
| | | | 315/119 |
| 2015/0181682 A1* | 6/2015 | Shet | H05B 33/0806 |
| | | | 315/127 |
| 2016/0353531 A1* | 12/2016 | Conner | H04N 5/2354 |
| 2017/0231047 A1* | 8/2017 | Hsu | H05B 33/0845 |

* cited by examiner

*Primary Examiner* — Dedei K Hammond
*Assistant Examiner* — Raymond R Chai
(74) *Attorney, Agent, or Firm* — Hayes Soloway PC

(57) ABSTRACT

An electronic driver for transforming an input voltage provided by an electrical ballast into an operating voltage for an LED lighting module is provided, comprising an input for connecting the electrical ballast to the electronic driver, an output for connecting the LED lighting module to the electronic driver, and an bypass circuit, wherein the bypass circuit is adapted for being connected in parallel to the output if a low input voltage is provided at the input and for being disconnected from the output if a high input voltage is provided at the input.

20 Claims, 3 Drawing Sheets

ELIMINATING FLICKER AT LIGHT LOAD FOR DRIVER COMPATIBLE WITH NAFTA DIM ECG

CROSS-REFERENCE

This patent application claims the benefit of and priority to Chinese Patent Application No. 2017109094099 filed on Sep. 29, 2017, the entire disclosure of which is incorporated herein by reference.

TECHNICAL FIELD

The present application relates to an electronic driver for an LED lighting module and an LED lamp.

TECHNICAL BACKGROUND

For years, fluorescent lamps have been commonly known and widespread lighting modules as efficient alternatives for incandescent light bulbs. However, with the advent of LED lamp, even more efficient and long-lived lighting means are available. Therefore, there is a demand for replacing existing fluorescent lamps with LED lamps.

Currently available fluorescent lamps are usually operated with an electrical ballast (also called electronic control gear, ECG) for regulating and limiting the current that is provided to the fluorescent lamp and for providing an ignition voltage during a startup process of the fluorescent lamp. The electrical ballast is part of the lamp fixture for the fluorescent lamp.

Replacing existing electrical ballasts in existing lamp fixtures would be labor-intensive and thus requires substantial expenses. Therefore, operating LED lamps with already installed electrical ballasts is favorable. In order to provide an LED lamp that is compatible with the electrical ballast, currently available LED lamps comprise electronic drivers for adapting the voltage and/or current provided by the ballast to the requirements of the lighting module of the LED lamp, which comprises the light-emitting diodes. Otherwise, electronic and/or optoelectronic components of the LED lamp might be damaged or destroyed by the ballast due to high voltages that are produced during the starting sequence. Further, since the power consumption of an LED lamp is lower than that of a fluorescent lamp, without the electronic driver, the electrical ballast would operate in an unstable status.

However, currently available electronic drivers have some disadvantages. For example, during the preheating stage, flickering of the LED lamp might occur due to an unstable input current provided by the electrical ballast. Further, after ignition, flickering of the LED lamp could occur, in particular in the case of the LED lamp being dimmed with a dimmer. In general, the flickering may be due to a combination of a low output power and the ripple current provided by the electrical ballast.

One solution to these problems would be to increase the power consumption of the LED lamp. Thereby, the operating voltage of the LED lamp would be larger than the input voltage provided by the electrical ballast during the preheating stage. This would, however, require increasing the number of light-emitting diodes in the LED lamp and would thus be expensive. A further solution would be to detect the high ignition voltage and to connect the lighting module of the LED lamp to the electrical ballast only after ignition has been finished. Though, this approach could result in an overcurrent at the lighting module after ignition. For reducing the flickering, a linear circuit for filtering the ripple current provided by the electrical ballast could be added to the electronic driver, but this would lead to a high power consumption of the LED lamp due to losses in the linear circuit.

SUMMARY OF THE INVENTION

In view of the above-described disadvantageous of currently available systems, it is an object of the present invention to provide an improved electronic driver for an LED lighting module. A further object is to provide an improved LED lamp.

These objects are solved by an electronic driver and an LED lamp according to the independent claims. Preferred embodiments are given by the dependent claims, the description and the drawings.

Accordingly, an electronic driver for transforming an input voltage provided by an electrical ballast into an operating voltage for an LED lighting module is provided. The electronic driver comprises an input for connecting the electrical ballast to the electronic driver, an output for connecting the LED lighting module to the electronic driver, and an bypass circuit, wherein the bypass circuit is adapted for being connected in parallel to the output if a low input voltage is provided at the input and for being disconnected from the output if a high input voltage is provided at the input.

Preferably, the bypass circuit constitutes an electrical bypass for the output if a low input voltage is provided at the input of the electronic driver. The bypass circuit preferably has a low impedance, in particular lower than an impedance of an LED lighting module that is adapted for being connected to the electronic driver, and/or an impedance equivalent to the LED lighting module. Due to the bypass circuit, the LED lighting module can be essentially disconnected from the electronic driver in the case of a low input voltage, thereby reducing flickering of the LED lighting module during a low input voltage.

The electrical ballast may provide an AC input voltage that may be transformed into a DC voltage by the electronic driver. In general, electrical ballasts are embodied current-limiting and the voltage at the output depends on the load connected to the output. A light load may, for example, be connected to the electrical ballast if the LED lamp is dimmed and/or if the electrical ballast is in preheating mode. A high load may, for example, correspond to a normal operation mode of the LED lamp. By providing a bypass circuit, the output may be bypassed, i.e. bridged. If the output is bypassed, the impedance of the bypass circuit is coupled to the inputs.

Hereinafter, the terms "providing", "applying", "coupling" (and so on) a voltage and/or a current to an electronic component of the electronic driver do not exclude other electronic components from being positioned in between the voltage source and/or the current source and the electronic component.

Furthermore, throughout this application, an indefinite article, such as "a" or "an", may be understood as singular or plural, in particular with the meaning "at least one", "one or more", etc., unless this is explicitly excluded, for example by the term "exactly one", etc.

According to at least one embodiment of the electronic driver, the low input voltage corresponds to a voltage during a preheating stage and/or during a low dimming stage of the electrical ballast. The high input voltage may correspond to the regular operation voltage of the LED lighting module.

According to at least one embodiment of the electronic driver, the bypass circuit comprises a dummy load such that the dummy load is connected in parallel to the output if a low input voltage is provided at the input and is disconnected from the output if a high input voltage is provided at the input. The dummy load may comprise or consist of an RC circuit, in particular with a capacitor and a resistance connected in parallel. Preferably, the dummy load has a low impedance and/or an impedance equivalent to the impedance of the LED lighting module.

According to at least one embodiment, the electronic driver comprises a voltage detection circuit and the bypass circuit comprises a switch. The voltage detection circuit is adapted for providing a first control signal to the switch such that the switch is in a closed state if a low input voltage is provided at the input and for providing a second control signal to the switch such that the switch is in an open state if a high input voltage is provided at the input. The closed state may correspond to a conducting state ("ON" state) of the switch and the open state may correspond to a non-conducting state ("OFF" state) of the switch. The first control signal may correspond to a high voltage signal and the second control signal may correspond to a low voltage signal or vice versa. Preferably, the switch is a transistor, in particular a MOSFET transistor. An output port of the voltage detection circuit may be coupled, in particular directly coupled, to a control port of the switch. The control port may be a gate of the switch.

According to at least one embodiment of the electronic driver, the voltage detection circuit is adapted for providing the second control signal if the input voltage exceeds a first threshold voltage and for providing the first control signal if the input voltage falls below a second threshold voltage, wherein the second threshold voltage is higher than the first threshold voltage. That is to say, the voltage detection circuit shows a hysteresis. The switch may thus change from the open state to the closed state if the input voltage falls below the second threshold voltage and from the closed state to the open state if the input voltage exceeds the first threshold voltage. Preferably, the second threshold voltage exceeds the first threshold voltage by at least 10 V, particularly preferably by at least 20 V. The low input voltage preferably is lower than the first threshold voltage and the high input voltage preferably is higher than the second threshold voltage.

Preferably, the hysteresis of the electronic driver is provided by the bypass circuit. In particular, the bypass circuit may have a lower impedance than the LED lighting module. Therefore, if the bypass circuit is connected in parallel to the outputs, the LED lighting module may be de-connected from the outputs and the output voltage may drop from the second threshold voltage to the first threshold voltage. Vice versa, if the bypass circuit is de-connected from the outputs, the LED lighting module may be connected to the outputs and the output voltage may increase from the first threshold voltage to the second threshold voltage. The hysteresis, in general, may advantageously allow for preventing an intermediate regime, where the LED lighting module may be switched on and off due to oscillations in the input voltage around a threshold voltage.

According to at least one embodiment of the electronic driver, the voltage detection circuit is an ECG voltage detection circuit that is adapted for detecting the input voltage provided at the input, in particular the input voltage provided by the electrical ballast. For example, the voltage detection circuit is coupled to the input of the electronic driver.

According to at least one embodiment of the electronic driver, the voltage detection circuit is an LED voltage detection circuit that is adapted for detecting an output voltage provided at the output. In particular, in the case of the LED lighting module being connected to the electronic driver, the LED voltage detection circuit may be adapted for detecting the voltage drop at the LED lighting module.

In general, the voltage detection circuit may comprise a diode, in particular a Zener diode. The voltage detection circuit may comprise further electronic components, such as resistors and/or capacitors.

According to at least one embodiment of the electronic driver, the bypass circuit comprises only the switch and electrical wiring such that, if the switch is in the closed state, an impedance of the bypass circuit essentially vanishes. The bypass circuit may thus be free of a dummy load. This configuration may be particularly preferred in the case of the voltage detection circuit being an ECG voltage detection circuit. "Essentially vanishes" preferably means that the impedance, in particular the resistance, of the bypass circuit is given only by the resistances of the wiring. In comparison to an impedance of the LED lighting module, the impedance of the bypass circuit in this case may be seen as a impedance of 0 Ohm.

According to at least one embodiment of the electronic driver, the bypass circuit comprises the switch and the dummy load, wherein the switch and the dummy load are connected in series. This configuration may be particularly preferred in the case of the voltage detection circuit being an LED voltage detection circuit. The impedance of the bypass circuit may then be essentially determined by the impedance of the dummy load. Preferably, the bypass circuit consists only of the dummy load, the switch and additional wiring.

Further, an LED lamp is provided. The LED lamp preferably comprises an electronic driver as described herein. That is to say, all features disclosed with reference to the electronic drive are also disclosed for the LED lamp and vice versa.

The LED lamp comprises an electronic driver, in particular an electronic driver as described herein, and an LED lighting module with at least one light-emitting diode. The LED lighting module is connected to an output of the electronic driver, in particular the output as described herein. Preferably, the LED lamp is a retrofit LED lamp for replacing a fluorescent lamp.

According to at least one embodiment of the LED lamp, the bypass circuit has a lower impedance than the LED lighting module. In particular, the bypass circuit has a lower resistance than the LED lighting module. This may allow for bypassing the LED lighting module by use of the bypass circuit.

BRIEF DESCRIPTION OF THE DRAWINGS

Preferred embodiments of the invention will be explained in the following, having regard to the drawings.

DETAILED DESCRIPTION OF THE INVENTION

In the following, exemplary embodiments of an electronic driver and an LED lamp as described herein will be described with reference to the figures. The same or similar elements or elements having the same effect may be indicated by the same reference number in multiple figures. Repeating the description of such elements may be omitted in order to prevent redundant descriptions. The figures and the size relationships of the elements illustrated in the figures among one another should not be regarded as to scale. Rather, individual elements may be illustrated with an exaggerated size to enable better illustration and/or better understanding.

Figure 1:
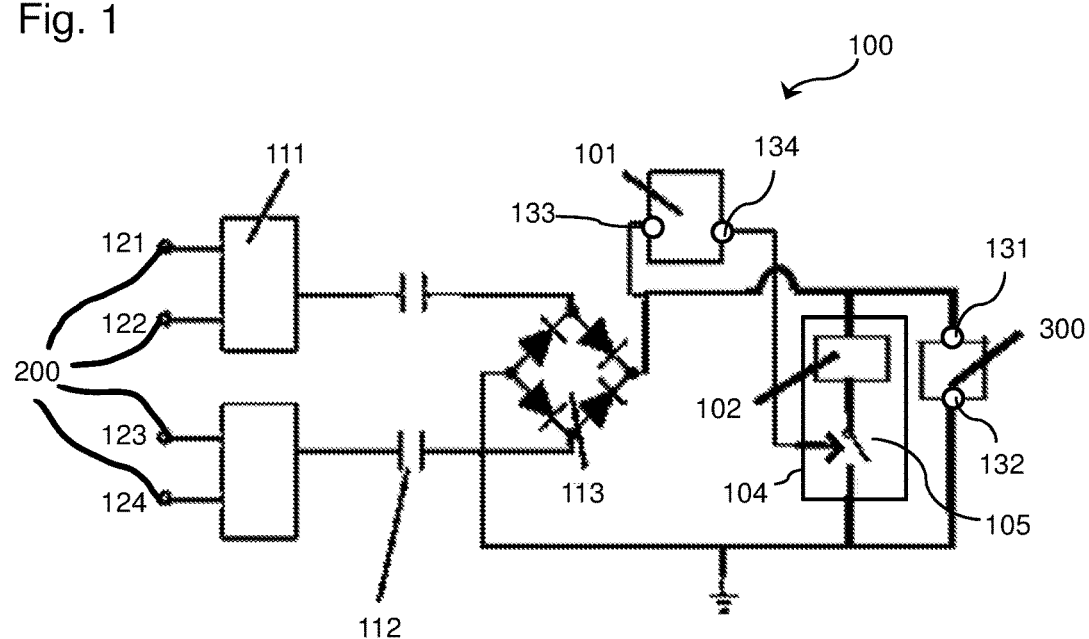
FIGS. 1, 2, 3A and 3B show exemplary embodiments of an electronic driver and an LED lamp as described herein.

With reference to the schematic circuit diagram of FIG. 1, an exemplary embodiment of an electronic driver 100 described herein is explained in detail. The electronic driver 100 comprises inputs 121, 122, 123, 124, a voltage detection circuit 101, a bypass circuit 104 with a dummy load 102 and a switch 105, a filament circuit 111, a current-limiting circuit 112, a rectifier bridge 113, and outputs 131, 132. The inputs 121, 122, 123, 124 are adjusted for being connected to an electrical ballast 200. The outputs 131, 132 are adjusted for being connected to an LED lighting module 300. The filament circuit 111 may provide an electromagnetic decoupling of the rest of the electronic driver 100 from the input 121, 122, 123, 124.

The rectifier bridge 113 is adapted for transforming the AC voltage and/or AC current provided by the electrical ballast 200 to a DC voltage and/or a DC current. The electrical ballast 200 may further comprise a dimmer for regulating the input voltage provided at the inputs 121, 122. The current-limiting circuit 112 is coupled in between the inputs 121, 122, 123, 124 and the rectifier bridge 113. The current-limiting circuit 112 is adapted to limit and/or smooth the input current provided by the electrical ballast 200.

In the exemplary embodiment of FIG. 1, the voltage detection circuit 101 is an LED voltage detection circuit. The LED voltage detection circuit is adapted for providing a first control signal S1 if a low voltage is present at the LED lighting module 300 and for providing a second control signal S2 if a high voltage is present at the LED lighting module 300. In general, the voltage detection circuit 101 may comprise an input 133, which is connected to the LED lighting module 300 in the case of an LED voltage detection circuit or to the electrical ballast 200 in the case of an ECG voltage detection circuit, and an output 134 for providing the first control signal S1 and the second control signal S2.

During preheating and/or during an increase of a dimmer output voltage level (e.g. from 0 V to 2 V), the input voltage may be low. During such an operation mode, the voltage at the LED lighting module may also be low, for example between 0 V and 70 V. If the voltage at the outputs 131, 132 is low, the voltage detection circuit 101 may provide a first control signal S1 to the switch 105. In the case of the first control signal S1 being applied to the switch 105, the switch 105 changes into a conducting (closed) state. Thereby, the dummy load 102 is connected in parallel to the LED lighting module 300. This results in a bypass of the LED lighting module 300 via the dummy load 102. Therefore, the LED lighting module 300 will be turned off during the low voltage period and no flicker appears at the LED lighting module 300.

If the input voltage is further increased, for example at the end of the preheating mode and/or during an increase of the dimmer voltage, the output voltage at the outputs 131, 132 increases above a first voltage threshold V1. The first voltage threshold V1 may be, for example, 70 V. When the first voltage threshold V1 is reached, the voltage detection circuit 101 switches from the first control signal S1 to the second control signal S2. In the case of the second control signal S2, the switch 105 changes into a non-conducting (open) state. Thereby, the bypass of the LED lighting module 300 is removed and the impedance of the LED lighting module 300 is coupled to the inputs 121, 122, 123, 124. Since the LED lighting module 300 is now coupled to the inputs 121, 122, 123, 124, the output voltage at the outputs 131, 132 increases to a higher voltage value due to the higher load at the outputs 131, 132, preferably to a voltage value above a second threshold voltage V2. The second threshold voltage V2 may, for example, be 102 V. At this higher voltage value, no flickering occurs at the LED lighting module 300. During a further increase of the input voltage, the voltage detection circuit 101 may provide the second control signal S2, thereby keeping the switch 105 in the non-conducting state.

Figure 2:
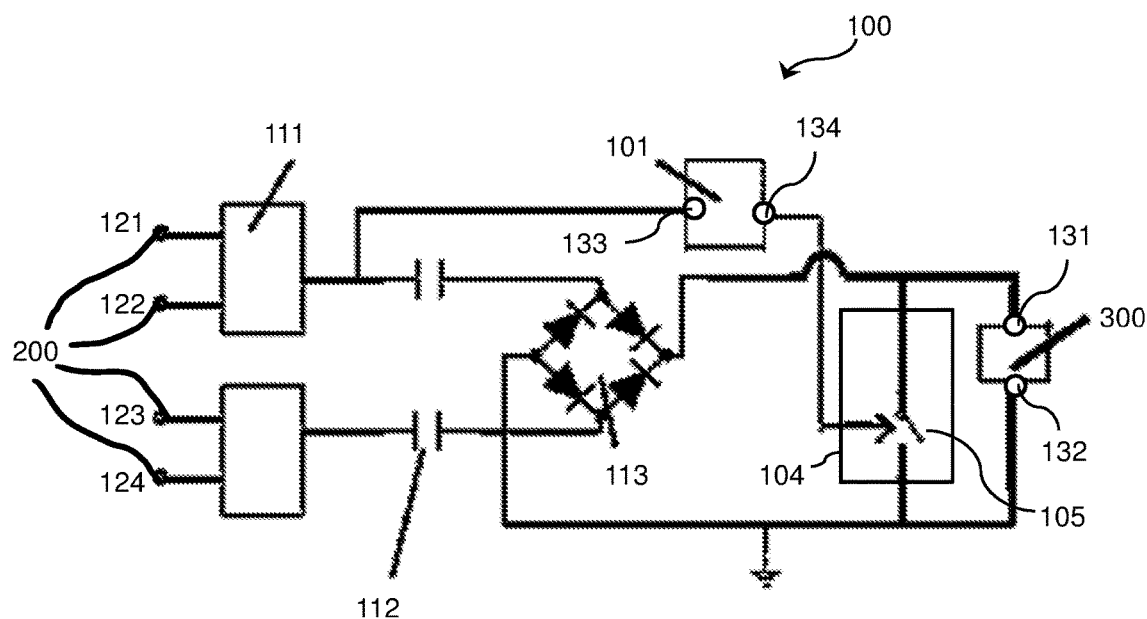

With reference to the schematic circuit diagram of FIG. 2, an exemplary embodiment of an electronic driver 100 described herein is explained in detail. In contrast to the exemplary embodiment of FIG. 1, the voltage detection circuit 101 is now an ECG voltage detection circuit that detects the input voltage at the inputs 121, 122. The bypass circuit 104 is free of a dummy load 102 and only comprises a switch 105 and wiring. For a light load during preheating and/or dimming, a bypass is provided via the switch 105 in a similar fashion as for the exemplary embodiment of FIG. 1. In contrast to FIG. 1, the bypass is now essentially a 0 Ohm-bypass bridge, which may allow for reducing losses in the case of a light load.

Figure 3A:
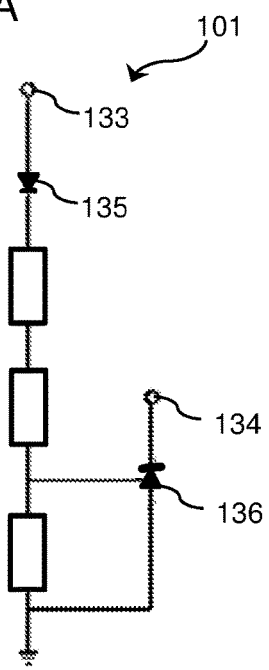

With reference to the schematic circuit diagram of FIG. 3A, an exemplary embodiment of a voltage detection circuit 101 for an electronic driver 100 described herein is explained in detail. The voltage detection circuit 101 shown in FIG. 3A may be an LED and/or an ECG voltage detection circuit. The voltage detection circuit 101 comprises an input 133 and an output 34. A first diode 135, a shunt regulator 136 and a few resistors are coupled in between the input 133 and the output 134. Preferably, the first diode 135 and/or the shunt regulator 136 become(s) conductive only if the voltage at the input 133 exceeds a pre-determined threshold voltage V2. In particular, the shunt regulator 136 may be a three-terminal adjustable shunt regulator (TL431). The shunt regulator 136 preferably detects the voltage in between the resistors and thus at the input 133. If the voltage is less than a predetermined value, particularly given by the resistors, the output of the shunt regulator 136 at the output 134 is a low-level signal. Otherwise, the output of the shunt regulator 136 is a high-level signal.

Figure 3B:
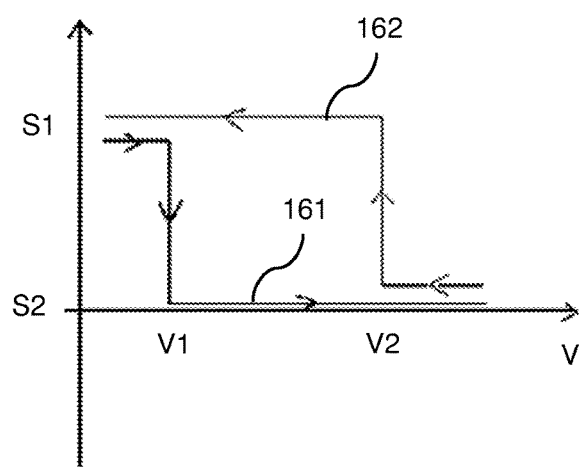

With reference to the schematic diagram of FIG. 3B, the behavior of the voltage detection circuit 101 of exemplary embodiment of an electronic driver 100 in the case of a voltage increase 161 and in the case of a voltage decrease 162 is explained in detail.

In the case of a voltage decrease 162, the output voltage at the outputs 131, 132 may decrease from a maximum value to the second threshold voltage V2. Until the second threshold voltage V2 is reached, the voltage detection circuit 101 provides the second control signal S2, which may correspond to a low voltage signal. Below the second threshold voltage V2, the voltage detection circuit 101 provides a first control signal S1 that results in the switch 105 changing from a non-conducting (open) state into a conducting (closed) state. The outputs 131, 132 may thus be bypassed and the output voltage may drop to a value corresponding to the load of the bypass circuit 104 due to the impedance at the outputs 131, 132 changing from the impedance of the LED lighting module 300 to the impedance of the bypass circuit 104.

Vice versa, in the case of a voltage increase 161, the voltage detection circuit 101 provides the first control signal S1 until a first threshold voltage V1 is detected by the voltage detection circuit 101. Above the first threshold voltage V1, the voltage detection circuit 101 provides the second control signal S2. The switch 105 is thus turned off (open state) and the LED lighting module 300 is connected to the circuit, resulting in an increase of the output voltage.

Figure 4:
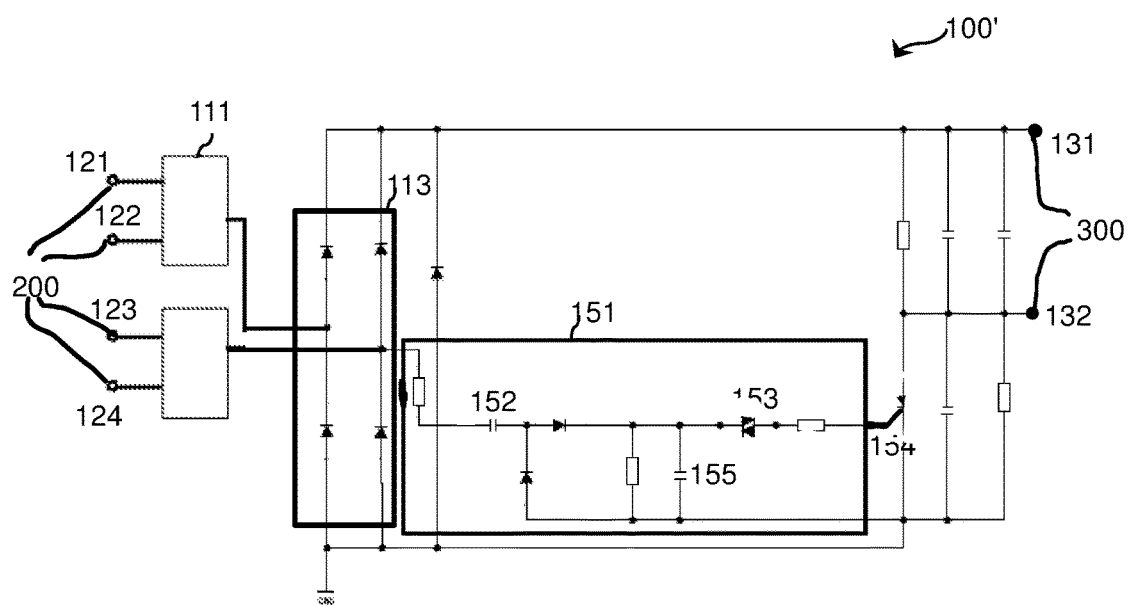
FIG. 4 shows an exemplary embodiment of an alternative driver.

With reference to schematic circuit diagram of FIG. 4, an exemplary embodiment of an alternative driver 100' is explained in detail. The alternative driver 100' comprises an ignition voltage detection circuit 151 for detecting the high ignition voltage provided by the electrical ballast 200 during ignition. Only after the ignition has happened, the voltage at a first capacitor 152 of the ignition voltage detection circuit 151 will increase, in particular above 32 V, resulting in a bidirectional trigger diode 153 of the ignition voltage detection circuit 151 providing enough current to trigger an SCR switch 154. Such an ignition voltage detection circuit 151 has the disadvantage of causing over-currents after the ignition. Further, a large capacitance 155 is required in the ignition voltage detection circuit 151, which may result in undesired losses.

Figure 5A:
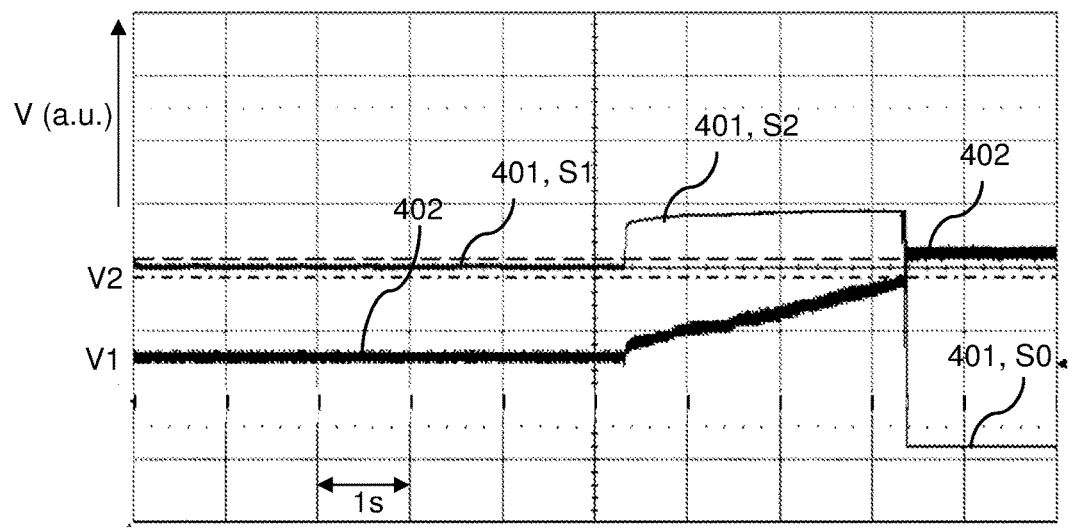
FIGS. 5A and 5B show exemplary embodiments of an electronic driver as described herein.
Figure 5B:
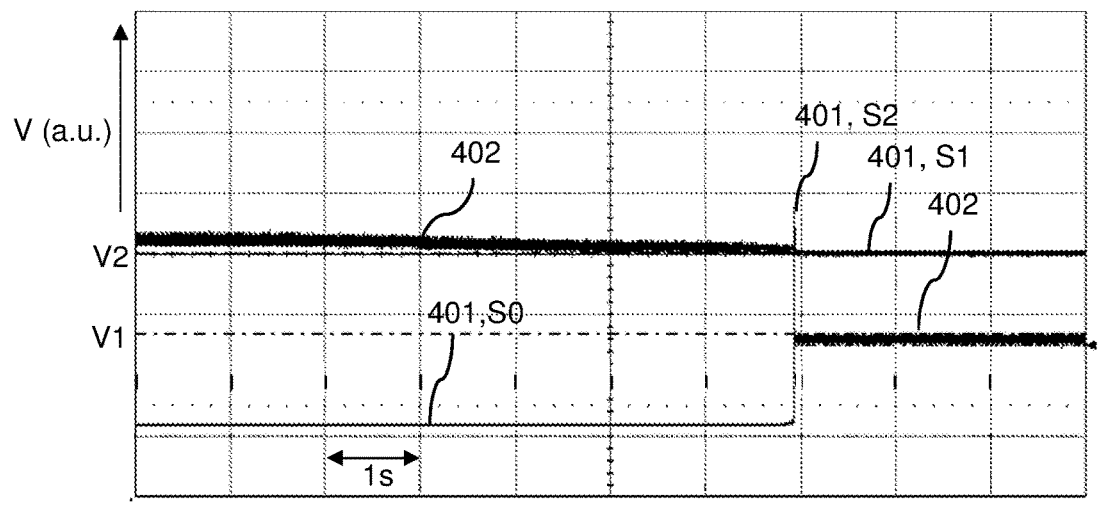

With reference to the voltage measurements of FIGS. 5A and 5B, an exemplary embodiment of an electronic driver 100 as described herein is explained in detail. FIGS. 5A and 5B show an output voltage 402 at the outputs 131, 132 if an LED lighting module 300 is connected to the outputs 131, 132 and gate voltage 401 at a gate of the switch 105. The gate voltage 401 may correspond to the control signal 401 provided by the voltage detection circuit 101. FIG. 5A shows an input voltage increase 161 and FIG. 5B shows an input voltage decrease 162. The voltages are shown in arbitrary units (a.u.) in FIGS. 5A and 5B. For example, an input voltage provided by the electrical ballast 200 and/or to the electrical ballast 200 may be 277 Vac. The measurements of FIGS. 5A and 5B have been conducted with an electronic driver 100 according to the exemplary embodiment of FIG. 1.

FIG. 5A shows an input voltage increase 161. The output voltage 402 initially is below the first threshold voltage V1. During this time, the gate voltage 401 corresponds to the first control signal S1. The switch 105 is closed and the dummy load 102 is connected in parallel to the LED lighting module 300. The LED lighting module 300 thus is turned off and no flicker occurs. When the input voltage is increased, the output voltage 402 also increases. When the first threshold voltage V1 is reached, the gate voltage 401 changes to a value corresponding to the second control signal S2. This results in the switch 105 being opened and the LED lighting module 300 being connected to the outputs 131, 132. The output voltage 402 increase to a value above the second threshold voltage V2. The LED lighting module 300 is turned on without any flickering. The gate voltage 401 reduces to a low value S0, for example 0 V, and the switch 105 is turned off.

FIG. 5B shows an input voltage decrease 162. The output voltage 402 initially is above the second threshold voltage V2. During this time, the gate voltage 401 is at a low value S0, for example 0 V, and the switch 105 is turned off. The LED lighting module 300 is on without any flickering. When the input voltage is decreased, the output voltage 402 also decreases. When the second threshold voltage V2 is reached, the gate voltage 401 quickly changes to a value corresponding to the second control signal S2. This results in the switch 105 being turned on and being open. When the output voltage 402 falls below the second threshold voltage V2, the gate voltage 401 changes to a value corresponding to the first control signal S1. The dummy load 102 is connected in parallel to the outputs 131, 132. The output voltage 402 thus decreases to a value below the first threshold voltage V1. The LED lighting module 300 is turned off without any flickering.

Advantageously, an electronic driver described herein may allow for reducing or even preventing flickering of the LED lamp during dimming of the LED lamp and/or during a preheating mode of the electrical ballast. During a dimming process, switching the switch by use of the control signals may be fluently. For this, the switch preferably is a fast switch, such as a transistor, in particular a MOSFET. The first threshold voltage and/or the second threshold voltage may be changed in an easy manner, thereby enabling a versatile and scalable electronic driver.

The invention is not restricted by the description based on the embodiments. Rather, the invention comprises any new feature and also any combination of features, including in particular any combination of features in the patent claims, even if this feature or this combination itself is not explicitly specified in the patent claims or exemplary embodiments.

LIST OF REFERENCE NUMERALS

100 electronic driver
100' alternative driver
101 voltage detection circuit
102 dummy load
104 bypass circuit
105 switch
111 filament circuit
112 current limiting circuit
113 rectifier bridge
121, . . . , 124 inputs
131, 132 outputs
133 input of voltage detection circuit
134 output of voltage detection circuit
135 first diode
136 shunt regulator
161 input voltage increase
162 input voltage decrease
V1 first threshold voltage
V2 second threshold voltage
S1 first control signal
S2 second control signal
S0 low value
401 gate voltage
402 output voltage

The invention claimed is:

1. An electronic driver for transforming an input voltage provided by an electrical ballast into an operating voltage for an LED lighting module, the electronic driver comprising:
    an input for connecting the electrical ballast to the electronic driver;
    an output for connecting the LED lighting module to the electronic driver; and
    a bypass circuit, wherein the bypass circuit is:
        connected in parallel to the output when a low input voltage is provided at the input, wherein the low input voltage corresponds to a voltage during at least one of a preheating stage and a dimming stage of the electrical ballast, and
        disconnected from the output when a high input voltage is provided at the input, wherein the high input voltage corresponds to a regular operation voltage of the LED lighting module;

wherein the electronic driver exhibits a hysteresis in operation, wherein the hysteresis is provided by the bypass circuit.

2. The electronic driver according to claim 1, wherein the bypass circuit comprises a dummy load.

3. The electronic driver according to claim 1, further comprising a voltage detection circuit, wherein the bypass circuit comprises a switch, and wherein the voltage detection circuit is adapted:
for providing a first control signal to the switch to place the switch in a closed state when the low input voltage is provided at the input; and
for providing a second control signal to the switch to place the switch in an open state when the high input voltage is provided at the input.

4. The electronic driver according to claim 3, wherein the voltage detection circuit is adapted:
for providing the second control signal when the input voltage exceeds a first threshold voltage; and
for providing the first control signal when the input voltage falls below a second threshold voltage, wherein the second threshold voltage is higher than the first threshold voltage.

5. The electronic driver according to claim 4, wherein in providing the first control signal and the second control signal, the voltage detection circuit shows the hysteresis.

6. The electronic driver according to claim 4, wherein:
the low input voltage is lower than the first threshold voltage; and
the high input voltage is higher than the second threshold voltage.

7. The electronic driver according to claim 3, wherein the voltage detection circuit is an electronic control gear (ECG) voltage detection circuit that is adapted for detecting the input voltage provided at the input.

8. The electronic driver according to claim 3, wherein the voltage detection circuit is an LED voltage detection circuit that is adapted for detecting an output voltage provided at the output.

9. The electronic driver according to claim 3, wherein the voltage detection circuit shows the hysteresis.

10. The electronic driver according to claim 3, wherein the voltage detection circuit comprises a shunt regulator.

11. The electronic driver according to claim 10, wherein the shunt regulator is a three-terminal adjustable shunt regulator.

12. The electronic driver according to claim 10, wherein the voltage detection circuit further comprises a diode coupled with the shunt regulator.

13. The electronic driver according to claim 12, wherein the diode is a Zener diode.

14. The electronic driver according to claim 12, wherein the voltage detection circuit further comprises at least one resistor coupled with the diode and the shunt regulator.

15. The electronic driver according to claim 1, wherein the bypass circuit consists of a switch and electrical wiring and wherein, with the switch in the closed state, an impedance of the bypass circuit, when compared with an impedance of the LED lighting module, is seen as an impedance of 0 ohms.

16. The electronic driver according to claim 1, wherein the bypass circuit comprises a switch and a dummy load, and wherein the switch and the dummy load are connected in series.

17. An LED lamp comprising:
the electronic driver according to claim 1; and
the LED lighting module with at least one light-emitting diode, wherein the LED lighting module is connected to the output of the electronic driver.

18. The LED lamp according to claim 17, wherein the bypass circuit has a lower impedance than the LED lighting module.

19. The electronic driver according to claim 1, wherein the bypass circuit consists of a switch and electrical wiring, and wherein, with the switch in the closed state, an impedance of the bypass circuit is given by a resistance of the electrical wiring.

20. The electronic driver according to claim 1, wherein the bypass circuit alone provides the hysteresis exhibited by the electronic driver.

* * * * *